United States Patent [19]
LaHaye et al.

[11] 4,060,379
[45] Nov. 29, 1977

[54] ENERGY CONSERVING PROCESS FURNACE SYSTEM AND COMPONENTS THEREOF

[75] Inventors: Paul G. LaHaye; John W. Bjerklie, both of Cape Elizabeth; Gerald G. Gallant, Jr., Gorham, all of Maine

[73] Assignee: Hague International, S. Portland, Maine

[21] Appl. No.: 652,877

[22] Filed: Jan. 27, 1976

Related U.S. Application Data

[63] Continuation-in-part of Ser. No. 547,381, Feb. 6, 1975.

[51] Int. Cl.² .............................................. F27D 17/00
[52] U.S. Cl. ....................................... 432/179; 431/9; 432/152; 432/222
[58] Field of Search ............... 432/222, 152, 199, 179; 431/115, 116, 9

[56] References Cited

U.S. PATENT DOCUMENTS

| | | | |
|---|---|---|---|
| 1,352,481 | 9/1920 | Selden | 432/222 |
| 2,918,117 | 12/1959 | Griffin | 431/116 |
| 3,146,821 | 9/1964 | Wuetig | 431/115 |
| 3,954,382 | 5/1976 | Hirose | 431/9 |

*Primary Examiner*—John J. Camby
*Attorney, Agent, or Firm*—Wolf, Greenfield & Sacks

[57] ABSTRACT

An energy conserving process furnace has a recuperator to utilize heat derived from exhaust gases in order to reduce fossil fuel consumption of the furnace. Elongated, enhanced surface ceramic heat exchanger tubes are used in the recuperator to recover heat energy from the exhaust gas. A preferred sealing arrangement is used between the metal and ceramic tubes to contain the combusion air. Heat is added by the recuperator to combustion air used in a fluid fuel burner.

A recirculating burner has a flame front outside of the burner in the combustion chamber. The recirculating burner means acts to reduce the combustion air requirements and to provide a combustion zone low in oxygen so as to prevent scale formation and oxidation of metals being treated in the furnace area.

9 Claims, 9 Drawing Figures

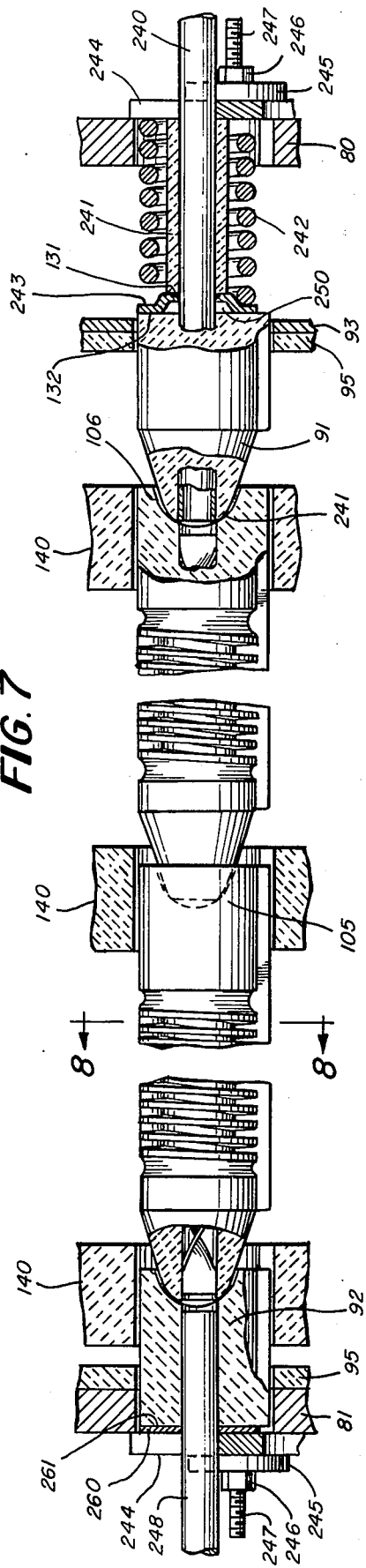

ENERGY CONSERVING PROCESS FURNACE SYSTEM AND COMPONENTS THEREOF

RELATED APPLICATION

This application is a continuation-in-part of applicant's copending application Ser. No. 547,381 filed Feb. 6, 1975.

BACKGROUND OF THE INVENTION

Many industries use furnaces for heating and firing materials as part of manufacturing processes. Often these processes must be carried out at high temperatures, i.e. over 1300° F. In many cases high temperature heating processes that use fuel oil or gas directly as heat sources, are very low in thermal efficiency since most of the energy in the fuel goes to heat air and gas which in turn maintains the temperature of the furnace walls and heats the material being processed. The furnace gas composed of the products of combustion and excess air is often exhausted while still at temperatures approximating that of the furnace walls, thus wasting substantial amounts of heat energy.

In the metal forging industry, oil and gas fired furnaces are employed to heat the work in process to forging temperatures. The work pieces are placed in the heated furnace zone through a narrow slot running essentially the full length of the furnace.

In such slot furnaces used for forging, it is known that the processed materials absorb a maximum of 15% of the heat generated and often as low as 2% of the heat generated in the combustion zone. Typically about 10% of the heat is lost through the furnace walls and the remaining 75–88% of the energy is exhausted from the furnace in the hot gas exhaust and lost to the environment.

SUMMARY OF THE INVENTION

According to the invention, an energy conserving process furnace has a combustion zone defined by heat insulating combustion chamber walls with fluid fuel burner means comprising a fuel nozzle, open to and heating the combustion zone to a temperature above 1300° F. An exhaust passage from the combustion zone leads to an exhaust port through an exhaust stack. A heat recuperator is positioned in the stack and carries means for heating combustion air prior to delivering said air to the burner means by extracting heat energy from exhaust gas from the combustion zone. Preferably, the exhaust stack comprises a slot portion and said means for heating are elongated ceramic heat exchange units. Preferably the exhaust passageway is divided into first and second passageways so as to permit safe and efficient operation of the furnace.

In the preferred method of this invention, a slot furnace is operated to conserve fuel needed to maintain the combustion zone of the furnace at a desired operating temperature. Burning fluid fuel in the furnace is mixed with preheated combustion air from the recuperator and recirculating gas from the furnace zone. The combustion air is preheated by exhaust gas from the furnace passing through an exhaust stack having a heat recuperator mounted therein. The combustion air is preheated to a temperature of for example 1200° F or higher by heat extracted from the exhaust gas in the stack by the use of the recuperator.

The recuperator preferably comprises a plurality of heat exchange elements or tubes formed of a ceramic material. The ceramic heat exchange elements have novel gas seals to contain the combustion air. A metal mounting flow-through pipe is connected to one end of a ceramic heat exchange element by a flange sealed to the metal tube and abutting an end of the ceramic heat exchange element. The flange is urged against the ceramic heat exchange element by resilient pressure. Ceramic element to element seals are formed by use of ceramic sealing means positioned adjacent a transient layer which is later vaporized or otherwise removed to allow good sealing with some movement permitted between elements.

A novel recirculating burner is preferably employed in the furnace. The recirculating burner is capable of accepting preheated combustion air at over 1500° F. The flame front of the burner is maintained outside of the burner to increase recirculation of furnace gases and maximize efficiency of the burner.

It is an object of this invention to provide methods of conserving energy in process furnace systems.

It is still another object of this invention to provide novel recirculating burner means which lowers energy requirements to maintain desirable temperatures in process furnaces and other applications.

It is still another object of this invention to provide a recirculating burner in accordance with the preceding object which is operable at high temperature of intake air to achieve considerable fuel savings and optimized combustion.

It is still another object of this invention to provide novel recirculating burner means in a process furnace to lower energy requirements so as to maintain desirable temperatures in a process furnace.

The use of a recirculating burner improves combustion performance and improves heat circulation in the furnace combustion zone with reduced oxide scale formation on work in process. By use of the novel recirculating burners of this invention heat release and heat transfer rates can be maximized. Better burning aids in the control of emissions of oxides of nitrogen. The operation of furnaces such as slot furnaces can remain as is conventional. No additional labor consuming actions are required. The material of the heat exchange units is inexpensive as compared to high temperature alloys which, only in certain cases, could otherwise be used. Except for the use of the recuperator and stack mounted on top of the furnace, the physical configuration of conventional slot furnaces, access ports, heating rates and other pertinent characteristics are maintained as known in the industry. Fuel savings using the process and constructions of this invention can be substantial. For example, fuel consumption can be reduced by 50% or more in conventional slot furnaces.

While the recuperator is described in conjunction with a forge furnace, the same concept could be used to recover heat energy escaping from any process such as a glass melting furnace or the exhaust gas from a gas turbine or other heat engine. While the novel recirculating burner of this invention is described in a particular form and use, it can be useful in other furnace applications and forms. Similarly the novel heat exchange units of this invention can be used in a variety of applications for radiating as well as collecting heat to and from a surrounding atmosphere.

BRIEF DESCRIPTION OF THE DRAWINGS

The above and other objects, features and advantages of the present invention will be better understood from a reading of the following specification in conjunction with the drawings in which:

FIG. 7 is a cross sectional view taken through line 7—7 of FIG. 4;

FIG. 8 is a cross sectional view through line 8—8 of FIG. 7 showing a heat exchange element of the recuperator.

DESCRIPTION OF PREFERRED EMBODIMENTS

Figure 1:
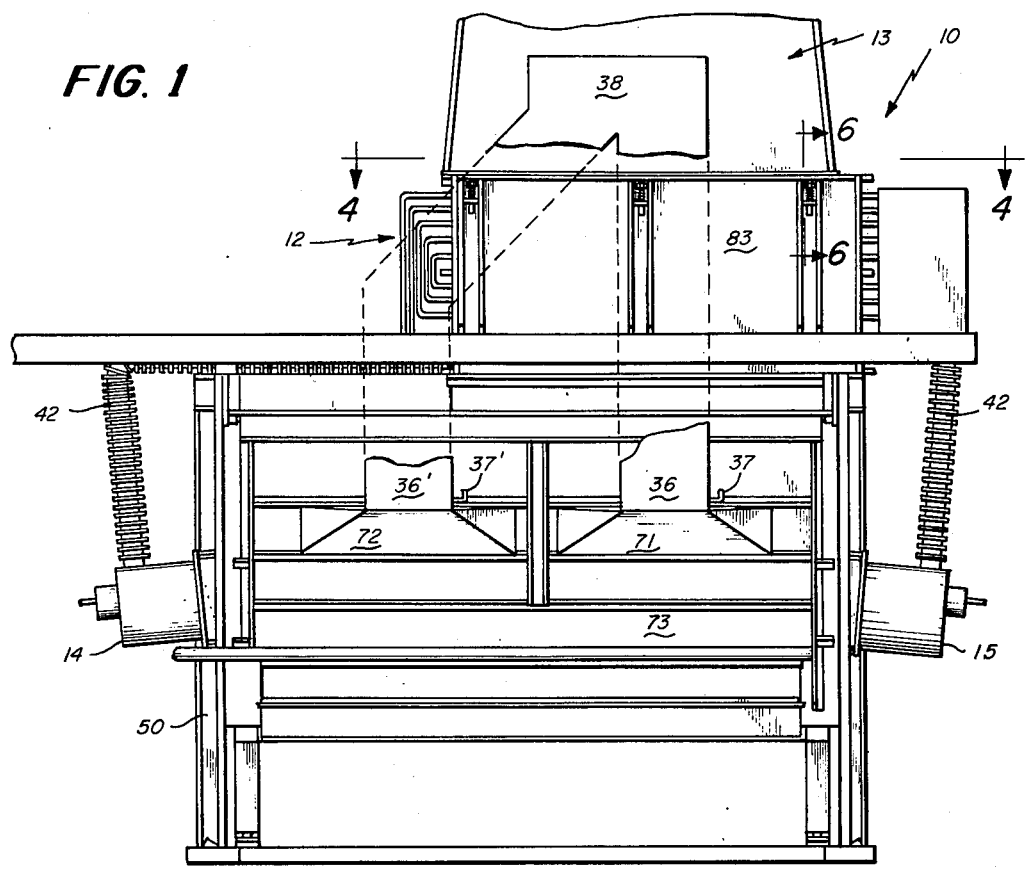
FIG. 1 is a front view of a slot furnace in accordance with a preferred embodiment of this invention.
Figure 3:
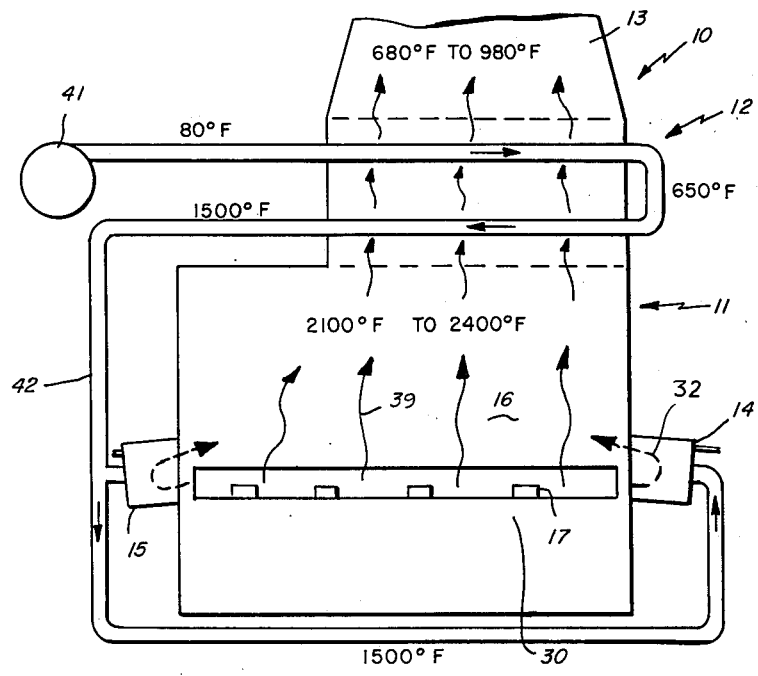
FIG. 3 is a diagrammatic view of the operation thereof.
Figure 2:
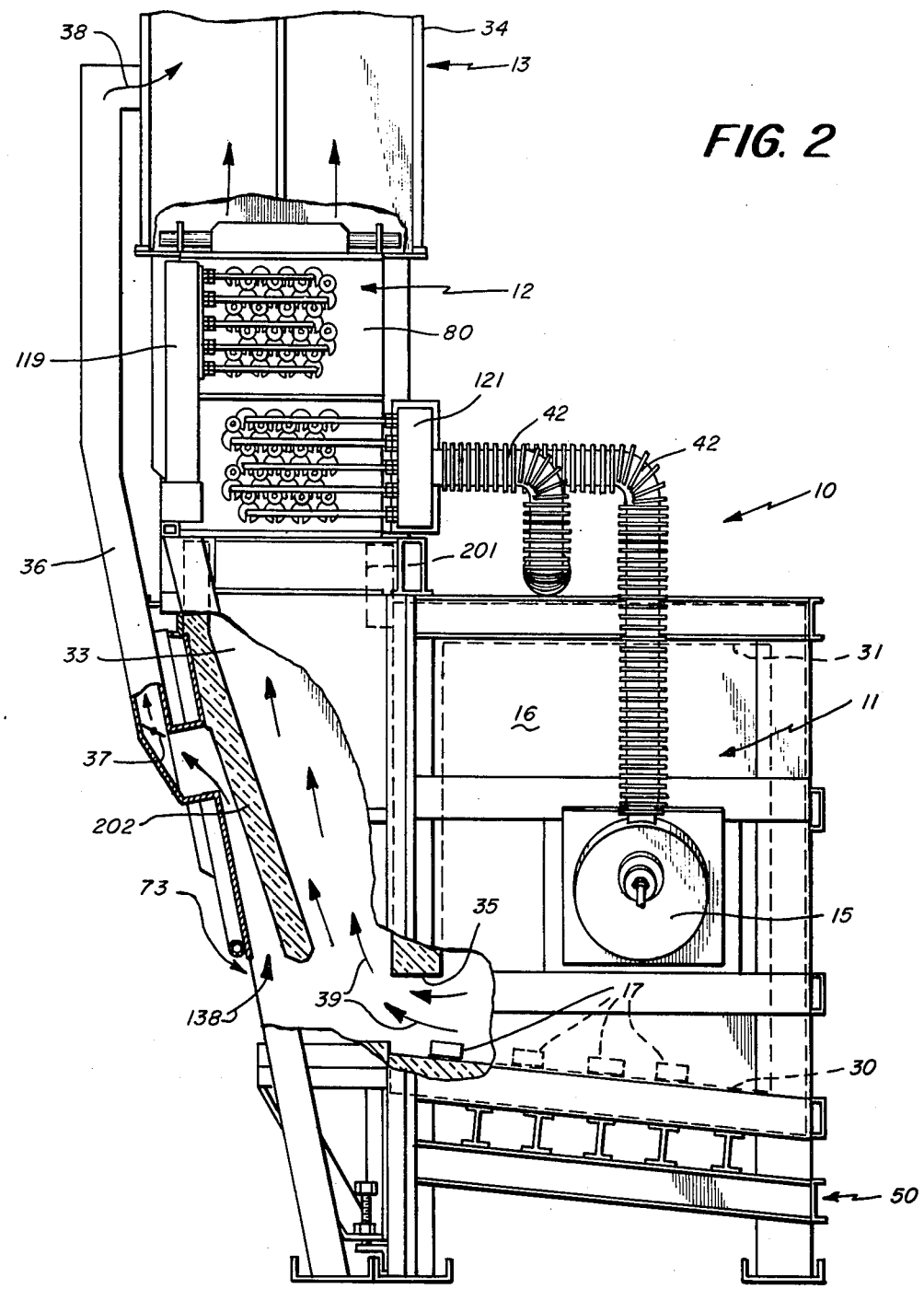
FIG. 2 is a side view thereof with parts broken away.

With reference now to the drawings and more particularly FIGS. 1–3, an energy conserving process furnace system is shown generally at 10 comprising a furnace 11, an exhaust gas stack 13, a recuperator 12 and burners 14 and 15 to heat work 17 in a combustion zone 16 of the furnace which is preferably in the form of a slot furnace for heating material prior to forging.

The furnace 11 of the preferred embodiment is a conventional slot furnace used in forging operations. The furnace defines the combustion zone 16 enclosed by conventional firebrick or other ceramic materials 31 with an opened elongated horizontal slot 35 extending on one side thereof. The slot extends substantially across the entire furnace. The firebrick combustion walls 31 are encased in a conventional supporting steel framework indicated generally at 50 comprising suitable I beams and plate metal as known in the art. The volume of the furnace combustion zone 16 in the preferred embodiment comprises about 150 cubic feet with an average height of 3.5 feet (arch shaped firebrick top), a width of 4.5 feet and a length of 9.5 feet. The slot 35 defines a length of 9 feet and a height of about 8 inches.

Work pieces such as 17 rest on a gravel covered floor 30 of a combustion zone 16 lined on all sides, top and bottom with heat insulating firebrick as indicated at 31. Burners 14 and 15, which are preferably recirculating burners as will be described, heat the combustion zone 16 as diagrammatically represented by the arrows 32. The burners can be angled slightly to increase gas circulation if desired. The recirculating design burners improve the furnace performance by improving circulation in the furnace cavity and improve combustion performance by operating closer to stoichiometric conditions thus providing more uniform heat input and reducing oxide scale formation on the work in process due to the lower oxygen concentration needed for combustion. The recirculation burner by operating closer to the stoichiometric air fuel ratio reduces the amount of exhaust gas emitted to the environment thereby reducing the energy losses of the furnace. It is believed that a high heat transfer rate to work in the furnace results from the use of a recirculating burner.

Heat derived from the combustion zone is carried by exhaust gases through the exhaust passage 33 from a slot opening 35 of the furnace. The exhaust passage 35 defines a first section passing directly to the recuperator 12 and a second section 36, 36' adjustable by dampers 37, 37' and having an outlet 38 to the exhaust stack 13 above the recuperator 12 to permit relatively cold air entering at 138 to by-pass the recuperator 12. Passageways 36, 36' and 33 are opened at roughly the same horizontal level at the bottom to allow air from the room or environment to be ingested as at 138 thereby permitting undiluted hot gas from the furnace to pass as indicated at 39 through the recuperator 12 to the stack 13. Passageways 36 and 36' are essentially identical and can be a single passageway if desired. In the preferred embodiment 10, passageways 36 and 36' are formed in part by hoods 71 and 72. Passage 33 is lined throughout with ceramic insulation as indicated at 201 and 202. Passage 36 and 36' may or may not be lined with ceramic insulation.

The recuperator 12 preheats air from the environment taken in by a conventional pump 41 as for example at 80° F and passes the combustion air to the burners 14 and 15 through suitable conduits 42 as at a temperature of approximately 1500° F after being exposed in the recuperator to surface temperatures of from 500° F to 2400° F in a typical slot furnace operation.

Sufficient heat is extracted from the exhaust gases 39 in the recuperator to permit the stack gases going up to the stack to be reduced in temperature from above 2000° F to as low as 500° F thus recouping a significant amount of heat energy from the gas before the gas escapes to the atmosphere through stack 13.

When high temperature exhaust gases are involved over 1300° F, it has been costly and difficult to provide recuperation because of problems of deterioration of the heat exchange surface when metallic materials are employed. Problems have been encountered in large size ceramic heat exchange units because of difficulties which include thermal shock and mechanical vibration encountered in normal applications. When exhaust gases are over 2200° F, it is not practical or economically viable to use metals such as nickel and cobalt based alloys because of temperature limitations. Ceramics such as silicon carbide can be used for the heat transfer surface because of their high temperature strength and resistance to deterioration in the environment produced by the combustion of fossil fuels. In the present system as will be described, the heat transfer surfaces employed in the recuperator 12 are ceramic of special design.

In the operation described above, energy conserving is facilitated by the use of the recuperator to reduce the energy lost in the furnace exhaust gases and the use of recirculating burners which improve combustion performance and reduce the quantity of exhaust gas emitted to the atmosphere for a given energy input to the furnace by the burners.

Figure 9:
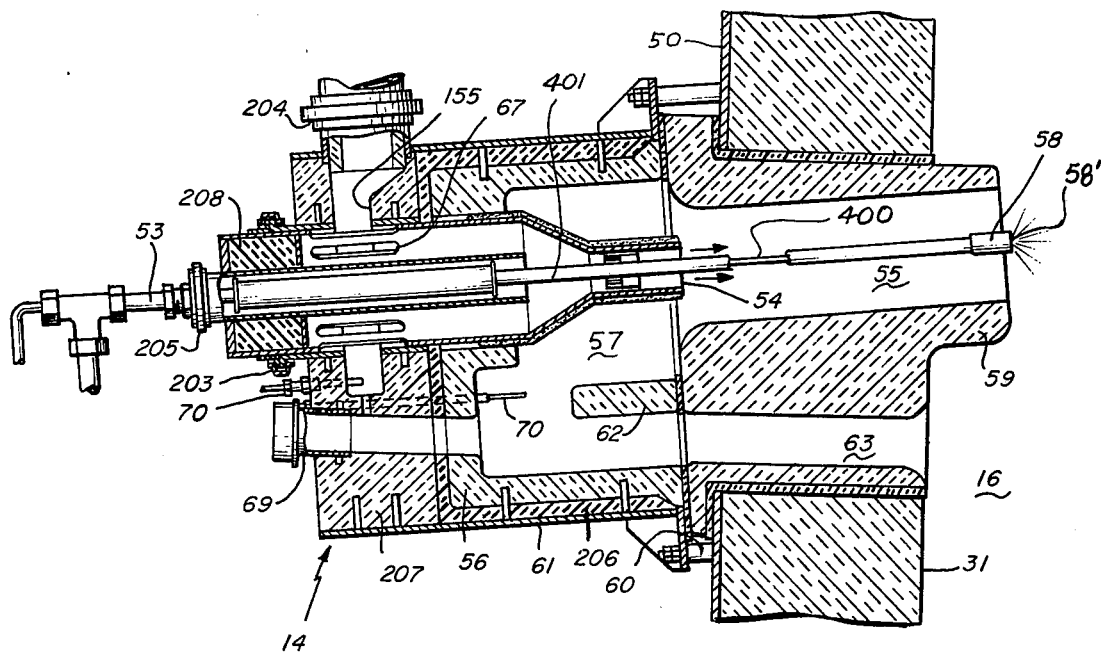
FIG. 9 is a semidiagrammatic cross sectional view through a preferred recirculating burner in accordance with a preferred embodiment of this invention.

In the recirculating burner of FIG. 9, hot gas recirculation is accomplished by inducing recirculation within the furnace by the action of a gas jet emitted by each of the burners. The process of burning fuel adds energy or turbulence to the jet of flame plume from the burner. The resulting movement of hot gases at the interface between the jet and surrounding furnace gas admixes the gases into the combustion plume. This recirculating action is known in burners and is enhanced by the design of the burners 14 and 15 as will be described. Combustion supporting air is injected into the recirculating burners at above 1000° F and preferably in the range of from 1000° F to 2400° F as at 1500° F. This is novel in that no recirculating burners known to the applicants have utilized combustion air injected at temperatures above 1000° F. However, the novel recirculating burners of this invention give improved furnace efficiency even when combustion air is at room temperature. The recirculated gases from the furnace are preferably in the range of 1000° F to 3000° F. The injected primary air creates an eductor action in the channel of each burner as will be described, with the inflow of furnace gas surrounding the nozzle having substantial action. The surrounding gases from the furnace 16 are induced into the jet in an amount of about 25% to 75% by weight of the primary air flow at low primary velocities corresponding to pressure drops of 15 to 20 inches of water at the primary nozzle 54. The hot recirculated gas may be aspirated from any point in the furnace or stack with appropriate interconnecting ducts. In the arrangement shown, the gases are recirculated from the furnace zone immediately in front of the burner block 59 and preferably close to the work in process.

It is desirable to have the recirculated gas from the furnace 16 flow through the burner rich in carbon dioxide and containing little or no unburned fuel. At elevated temperatures such as 1800° F and above, the carbon dioxide in the recirculated gas participates in oxidizing the carbonaceous particulate in the combustion area to carbon monoxide. Later in the process, the carbon monoxide is oxidized to carbon dioxide. This combustion process permits operating near stoichiometric air fuel ratios with a minimum amount of hydrocarbon particulate in the furnace resulting in cleaner furnace exhaust, i.e. smokeless stack effluent and low concentrations of carbon monoxide and nitrogen oxides. Further, the furnace environment contains lower concentrations of oxygen and is therefore less oxidizing than normally the case with furnaces not using recirculating burners, thereby minimizing the formation of oxide scale on the surface of the work in process 17.

Preferably the eductor channel 55 of the burner induces flow from the center of the furnace along the walls, floor and ceiling toward the burner location in the end walls. This sustained sweeping action of the gas on the surface of the furnace enhances the convective heat transfer from the hot furnace gas to the work in process and the furnace surfaces such as at 31. The effect is to maintain uniform wall temperature throughout the furnace cavity assuring more uniform heat input to the work in process.

Due to recirculation, the flame plume is smaller than in conventionally fired furnaces thereby increasing the local flame temperature for a given wall temperature and given flow rate.

In the preferred embodiment the furnace is provided with 2 identical recirculating burners 14 and 15 only one of which will be fully described for the purposes of brevity. As best shown in FIG. 9, burner 14 has the structure of a substantially conventional recirculating burner as known in the art. However, the burner parts have been modified to enable the burner to operate with a high primary combustion air supply temperature which can enter the burner at temperatures of 1500° F or higher.

Thus, all parts of the burner exposed to the heat of the furnace are formed of heat insulating ceramic such as castable ceramic, or coated with heat insulating ceramic or protected by high temperature resistant materials. The fuel (400) and atomizing air (401) tubes and nozzle 54 can be formed of metals such as stainless steel or other high temperature resistant materials. The primary or combustion air nozzle 54 can be formed of ceramic. The fuel tube can be enlarged to carry gas, igniter, scanners, cooling means, and other known components of burner tips. The burner has conventional piping 53 for injection of liquid or gaseous fuel along with atomizing air or steam (when used) in the case of oil. Pressure atomizing or other means of atomizing fuel known to the art may be used. The flow of the fuel goes to the fuel nozzle 58 with the heated combustion air derived from the recuperator flowing through the preferably concentrically located primary nozzle 54 and cylindrical eductor channel 55 in a burner ceramic block 59. Conventional high temperature gaskets are used at joints in the burner. The fuel nozzle tip 58′ is preferably located outside of the ceramic burner block 59. It is an important point of novelty that the tip of the burner produce a flame front outside the eductor channel and in the furnace to increase recirculation to obtain clean burning and maximized fuel and heat transfer efficiency. Conventional metal attachment means 60, are used to attach the burner in place to the outer furnace metal wall 50. Burner block 59 has a ceramic extension piece 62 attached thereto to define a recirculating channel formed by circular bore 63, leading to annular chamber 59 about the eductor nozzle and then to eductor channel 55. Conventional fittings and burner members such as 60, casing 61, inlet flange 204, and adjustable flange assemblies 203 and 205 preferably are used. Where axial adjustment of the eductor and nozzle tip are not desired fittings 203 and 205 can be stationary fittings. Additional high temperature insulation 206, 207 and 208 further enhances heat resistance of the burner.

Thus, in this embodiment, the recirculated gas is taken from the furnace zone 16 immediately in front of the burner. In alternate embodiments, the recirculated gas could be taken from alternate points such as immediately ahead of the recuperator, in channel 33 immediately after the recuperator in the stack 13 or from other points in the furnace. The burners 14 and 15 are each mounted on the end wall so that the flame plumes extend above the floor of the furnace and above the work pieces located therein to provide uniform radiation flux and convection heat release to the furnace walls and process material. Primary combustion air from the atmosphere is taken through the recuperator, preheated therein and delivered at a temperature of approximately 1500° F to the passageway 155. Air flows into an annular cavity around the eductor tube and from the cavity through the slots 67 to the eductor nozzle 54 where it is discharged into the eductor channel 55. The combustion air entrains furnace gas and induces a flow of gas through the passage consisting of 63, 57 and 55 into the furnace. The circulatory flow from the furnace to the burner cavity, through the eductor, and back into the furnace, is sustained by the action of the primary combustion air jet. The primary air and recirculated gas are mixed to some extent in the eductor channel 55.

The fuel is preferably injected by the fuel nozzle tip 58 just beyond the discharge opening of the eductor channel 55 in the furnace zone 16 to prevent blocking of jet induced recirculation. In addition, this position allows circulation in the furnace and increases convective heat transfer to work pieces and walls being heated. In the installation, the fuel nozzle tip may be located in the eductor channel 55 rather than in the furnace zone if desired. However, a reduction in the quantity of gas recirculated will result.

The eductor nozzle 54 can be axially adjusted so that the discharge point of the nozzle 54 relative to the eductor channel 55 can be changed if necessary to induce the desired recirculatory flow.

A sight port 69 and thermocouple ports 70 can be provided if desired to observe the combustion process in the furnace 16 and measure the gas temperature of the recirculated gas at 57. The burners 14 and 15 are designed to consume a total of 15 gallons of fuel oil per hour in the system 10. This requires approximately 1650 lbs. per hour of combustion air from the recuperator and 17 lbs. per hour of atomizing air delivered at 30 psi and room temperature to atomize the fuel when operating the furnace at 2100° F to 2400° F.

While a specific preferred recirculating burner has been described many variations can be used in the system of this invention. It is preferred to use the inventive recirculating burner of this invention which is heat resistant to recirculating gas temperatures of from 1000° F to 3000° F and combustion air temperatures of from 1000° F and higher as for example 2400° F. In addition the inventive feature of positioning the fuel nozzle tip 58' so as to provide a flame front outside of the eductor channel in the furnace area is important. The flame front is outside the eductor channel. In the case where recirculated gases are drawn from the combustion chamber the recirculating channel intake opening is placed far enough from the flame front so completely reacted gases are induced, yet near enough to achieve a compact arrangement. Preferably the flame front starts at the eductor channel exit or up to one and a half eductor channel diameters downstream. Such preferred recirculating burners can vary greatly in design. For example channel 63 can be annular channel concentric with the eductor channel or can open to other areas of the furnace or stack. Channel 63 preferably has 3 times the cross sectional area of channel 55. Nozzle 54 can be any conventional nozzle and can be a plural opening nozzle or vaned opening nozzle. The recirculating burners can have capacities of from ½ gallon to 1000 gallons of fuel oil per hour and can operate at atomizing air pressures of from 1 to 100 psi preferably 30 to 60 psi with fuel pressures of from 8 to 5000 psi. The pressure of the combustion air can be from 0.002 psi to at least 6 psi. In the preferred embodiment 14 channel 55 has a diameter of 6 inches, tube 401 has a diameter of ¾ inches, nozzle 54 has a diameter of 2 inches and is spaced from the channel 55 end by 18 ½ inches with tip 58' being ½ inch beyond the end of channel 55. Channel 55 has a length of 18 inches. However, the configurations and dimensions can vary so long as one gets desired eductor action, i.e. sufficient recirculation of furnace gases to maximize heat transfer and maximize the air fuel reaction rate preferably with the furnace gases induced into the jet in channel 55 in an amount of about 25% to 300% by weight of the primary or combustion air flow from nozzle 54.

The burners of this invention can be used in forge and process furnaces as well as for heating boilers, heating fluids, glass furnaces, melting furnaces and the like.

The exhaust stack section of the furnace system 10 comprises the slot 35 which is an exhaust port from the combustion chamber 16, an exhaust passageway 33 for hot air above which and in the path of which is mounted the recuperator 12. Above the recuperator 12 is an exhaust stack 13 leading to an upper exhaust port as suggested at 34. A second upwardly extending exhaust passageway is provided by duct work as indicated at 71 and 72 to provide passageways 36, 36' having a bottom opening substantially level with the slot 35 and a top opening 38 in the stack above the recuperator. A door to the environment is provided at 73 and dampers 37, 37' are located in the passageways 36, 36'. Passageways 36, 36' can be considered a single vertical passageway for purposes of function in the system.

In the preferred embodiment as suggested in FIG. 3, substantial recuperation of heat is carried out. Using a 20 ft. high exhaust stack with 160 to 180 lbs. of exhaust gas/hour/ sq. ft. of recuperator passage area, the desired temperature can be maintained at a total fuel usage rate of 15 gallons/hr. of fuel oil when 1500 pounds of steel per hour is treated in the furnace. When operating an identical furnace with non-recirculating burners and no recuperator, 30 gallons of fuel oil/hr. are required to maintain the desired furnace temperature.

The use of the dual vertical passageways in the exhaust system is important to provide for safe and efficient operation of the slot furnace. Although other systems could be used, this system of exhaust is found to be extremely beneficial.

When a cold furnace operation is initiated, the exhaust gases flow into passageway 33 and then overflow into passageways 36, 36'. As the temperature in the stack increases causing the natural draft or aspiration of the stack to increase, the exhaust gases flow through passageway 33 and thus through the recuperator. This is assured by the operator observing the flow pattern of the exhaust gas and adjusting the dampers 37, 37' so that to increase the pressure drop of passageways 36, 36' so that these passageways draw air from the room only and permit essentially all of the hot gases to flow through the recuperator 12. The furnace can then be operated with the furnace front completely opened and the furnace operator can have ready access to the work area of the furnace through slot 35 for insertion and removal of work in process 17 to be heated and later forged without resorting to a closure means such as doors at 73 in the furnace front although radiation screens may still be used. In conventional slot furnaces, doors are generally employed at 73 and substantial flow of exhaust gases out of the slot 35 can occur. The operator can be faced with hot blasts of gas when opening doors at 73 to gain access to the work in process 17. Particularly in the present embodiment, if the second air passageways 36, 36' were not used, hot exhaust gas 39 would tend to pass to the environment through 73 rather than through passage 33 to the recuperator 12 during transient operation. Therefore the preferred arrangement also protects the operator.

Figure 4:
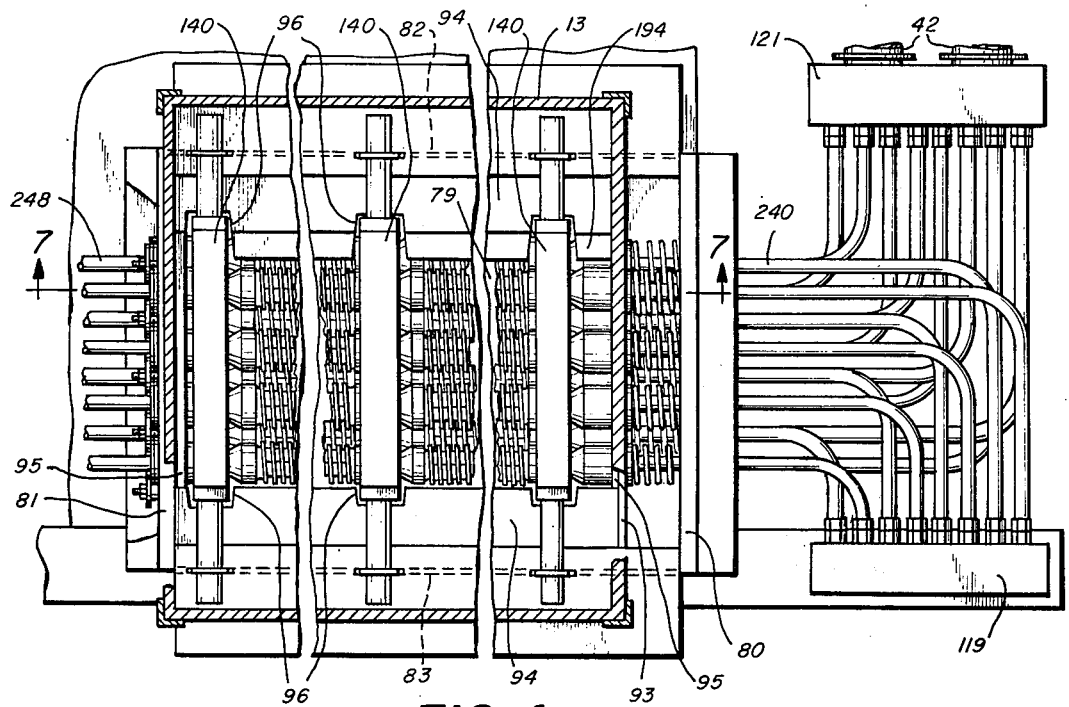
FIG. 4 is a cross sectional view taken through line 4—4 of FIG. 1.

In one configuration of the preferred embodiment of the recuperator 12 (FIGS. 4–8), the internal exhaust gas passageway 79 has a generally rectangular horizontal cross section with a length of 80 inches, a width of 17 inches and a height of 40 inches formed by the end tube sheets (FIG. 4) and side walls 82, 83 which are heat insulated. End walls 80, 81 form a rectangular cross sectioned casing with side walls 82, 83 and all of which are joined together by suitable welded joints which can include structural supports. Heat exchangers within the recuperator comprise ceramic tubes 90 arranged in 10 rows of 4 tube assemblies each arranged in a staggered, triangular matrix. Each tube assembly is preferably identical to the others and as best seen in FIG. 7, consists of two 42 inch long ceramic heat exchange tubes with an enhanced or finned outer surface 90 joined by male to female sockets therebetween and two ceramic end adapter pieces 91 and 92 having a female socket on one end and a male socket piece at the opposite end. The socket joints between each of the heat exchange units 90 and end pieces 91, 92 are close fitting, spherical surfaces under approximately 750 pounds of compression to prevent leakage of the combustion air passing therethrough. Compression springs preferably located at the male adapter end of the tube assembly maintain constant pressure on the socket joints while permitting differential thermal expansion of the tube assembly in operation. The male adapters can be supported by a metal tube sheet 93 shown in FIG. 7 if desired. The tube assemblies are preferably supported by 3 vertically extending ceramic tube sheets 140 located at each of the socket joints. The entire tube bundle, including the ceramic tube sheets, is contained within the insulated metal casing structure consisting of the side walls and end walls which form a rectangular frame. Structural ceramic insulating liner sheets 94 on either side of the assemblies provide vertical positioning slots 96 for the ceramic tube sheets. Sheets 94 in conjunction with end ceramic insulation 95 provide insulation to protect the metal frame.

Figure 5:
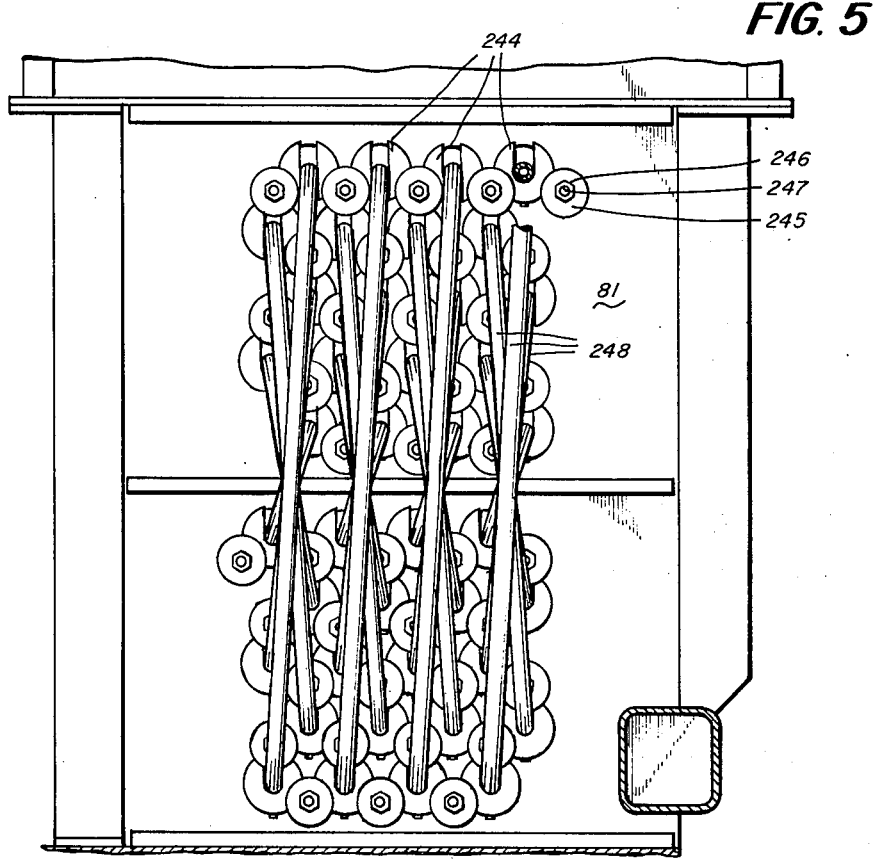
FIG. 5 is a right hand end view of the recuperator as shown in FIG. 4.

FIGS. 7 and 5 illustrate the end mounting of each tube assembly. Inlet metal tube 240 has a surrounding ceramic insulating sleeve 241 and passes into end adapter 91 ending short of male spherical end 241. Compression spring 242 presses against washer 245 to form a seal as will be described. An end of spring 242 is held in place by slotted washer 244 which is in turn held in place on the end wall 80 or 81 by washer 245 bound by nuts 246 on studs 247. An outlet pipe 248 is similarly positioned against axial movement by an identical washer and nut holding arrangement.

The heat exchange units have presented a problem in the art due to the fact that no high temperature operable elongated heat transfer surfaces capable of containing a pressurized fluid without leaking excessively have been previously accepted for widespread use in the art insofar as known to applicants. Each unit 90 is a key element in the design of the heat exchanger. All of the elements 90 used are preferably identical. These tubes have a configuration designed to obtain a maximum, overall heat transfer coefficient at minimum pressure drop and loss of the pressurized combustion air to the exhaust gas. The tubes have an enhanced external surface and in the preferred embodiment this consists of 1 and ¾ fins per inch with the basic tube cross section in the shape of an aerodynamically shaped teardrop 101 with a blunt leading edge 102 and a relatively sharp trailing edge 103 known to be optimum configuration in minimizing the pressure losses of the fluid flowing over the tube. The preferred embodiment has an overall outside diameter at the fins 100 of 3 ½ inch and an inner through bore diameter of the central bore 104 of 1 inch.

Each element has a male end 105 and a female end 106 which act as joining sockets as will be described.

The material of each unit 90 is ceramic in order to give resistance to the high temperatures encountered in the gas stream which can be from 1200° F to 2800° F and above yet provide for good heat transfer. Most ceramics have low thermal conductivity with the exception of silicon carbide and silicon nitride which are preferred for use in the ceramic heat exchangers of the present invention. Other ceramics having a thermal conductivity of at least 3 BTU/hr/ft$^2$/° F/ft. can be used. Preferably the silicon carbide is used in the form of a casting. For example, commercially available castable silicon carbide such as Carbofrax 11 a product of the Carborundum Company of Niagara Falls, New York, can be mixed with water and cast to a desired shape such as the shape of element 90. The shape is then fired to temperatures over 1800° F to develop strength and good thermal conductivity.

In a specific example of forming a heating element 90, Carborundum formula 3069-8 a commercially available form of Carbofrax 11 made up of castable silicon carbide using calcium-aluminate as a binder, is cast into the desired shape in a thermosetting plastic mold having a wax base mold release. Preferably the silicon carbide material is cast at room temperature and allowed to cure for 12 to 24 hours at room temperature. It is then removed from the mold, preheated for about 4 hours at 200° F and then fired at 2100° F for 4 to 8 hours. The working strength of the resulting product is 3500 psi in tension and the thermal conductivity is about 5 BTU/hr/ft$^2$/° F/ft.

As will be seen from FIG. 7, two types of seals are necessary to contain the cold air taken in from the atmosphere within the units 90 and tube assemblies. The first seal is the male to female socket seals as between the end pieces 91 or 92 and the units 90 and between adjacent units 90. Part of the seal is accomplished by the spring loading as previously described which urges the male and female sockets toward each other. It is clear that the ceramic tubes are not flexible because of the nature of the material and they cannot be welded nor should they be permanently joined in any way since they are exposed to some vibration and some degree of flexibility is desired. Moreover, any attempt to seal the units by use of mortar or other permanent joining often fails because of thermal distortions of the assembly.

In the preferred method of sealing the female and male socket joints, the male parts are dipped in molten wax or other transient material that will form a thin coating and can later be removed by heating. A conventional sealing compound is then coated on the adjacent spherical female portion of the joint as at 106. The sealing compound can be water glass, silicates or other materials which are resistant to the temperatures encountered in use. The tubes are then assembled with the sockets in engaging relationship while the seal material is still moldable to assure good conformance of the male end to the female end in each socket. The assembled units can then be heated to set the sealable material such as the water glass. Additional heating can be carried out to remove the wax or other material by melting or vaporizing. This leaves the joint free to flex since the male and female portions now closely conform in surface configuration to each other yet are not rigidly joined together. A slight degree of flexing can occur, yet, a good gas seal is provided. It should be understood that air is passed through the central bore of the heat exchange units under a pressure so that if any leakage occurs, it will be outwardly of the joint to prevent contamination of the combustion air with exhaust gases. When air is fed through the heat exchanger as by a pump 41 under a pressure of 2 psig or higher, excellent sealing occurs through the female and male joints.

It should be noted that the aligned bores 104 of the heat exchange units and end members may be provided with a helically twisted steel or other metal strip 111. The strip 111 can be of any metal preferably being 12 gauge stainless steel which is resistant to heat and yet provides some degree of rigidity. Th strip serves a dual function in that it creates a turbulence in the combustion air which is desirable to aid in the transfer of heat from the ceramic tube bore to the air and in addition, should fracture of a heat exchange tube 90 occur, the strip 111 has sufficient rigidity to hold the pieces of the tube in place until corrective measures can be taken by the operator. The strip 111 preferably extends into the end adapters 91 and 92. The units 90 preferably have an axial length of at least 30 inches to minimize the number of units and seals in each assembly.

Heat exchange assemblies are arranged to provide a single pass of the outside exhaust gas thereover in upward passage to the exhaust stack with a double pass of the incoming air through recuperator assemblies. Thus a 2 pass configuration is used on the air side which permits good recuperator effectiveness without resorting to an excessively complex configuration. More passes may be used; however, such 2 pass configurations as suggested in FIG. 5 are known for use in recuperators of various types. The 2 pass require the use of an inlet header 119, an inlet series of tubes indicated generally at 240 and suitable interconnection of pairs of tubes at 248 as shown in FIG. 5 and an outlet header 121 with interconnecting tubes 240 leading to tube system 42 to pass the combustion air to the burners 14 and 15. Thus, a second type of high temperature resistant seal is required in each heat exchange assembly, that is, a seal between a metal tube such as 240 or 248 and the inlet and outlet adapter pieces. In the preferred embodiment, the seal between the male and female spherical ceramic surfaces 105 and 106 are as previously described. Tube 240 is mounted within end piece 91 in a loose slip fit with the outer diameter of the tube being 1 inch and the inner diameter of the element 91 being 1.030 inch. A 3 ⅛ inch outer diameter steel ring 243 is welded to the tube 240 as at 131. Spring 242 maintains sufficient pressure on the ring to form a seal between it and a flat end surface 132 of the end piece 91. The steel ring 243 can be countersunk at 250 to permit the ring to distort thereby conforming to surface 132 to part 91 assuring a seal under the action of the spring 242. Washer 260 is similarly urged against end surface 261 to provide a seal at the outlet end piece 92.

Figure 6:
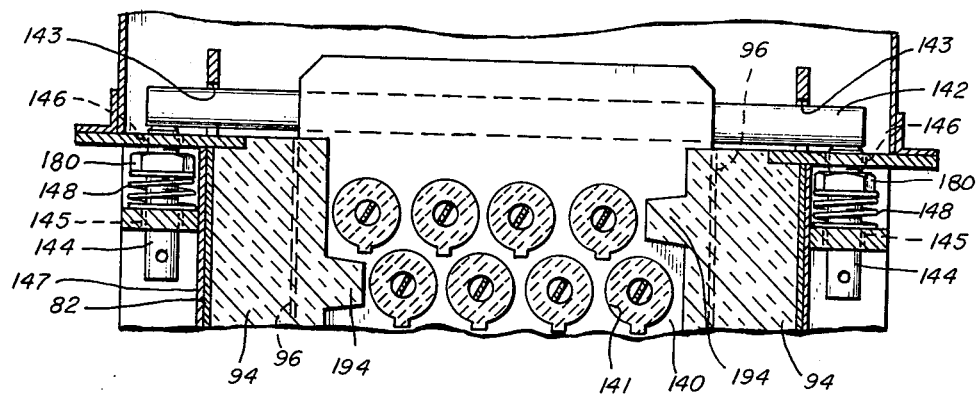
FIG. 6 is a cross sectional view taken through line 6—6 of FIG. 1.

In addition to the spring mounting of each assembly of heat exchange units, the units are further supported by ceramic tube sheets 140 as best shown in FIG. 6. Each tube sheet 140 can be formed of castable silicon carbide or alumina and has preformed holes 141 through which the assemblies of heat exchange units 90 pass and are supported thereby. Because of the environment in which the process furnaces are used, i.e. vibration due to the operation of forges and/or drop hammers, it is preferred to vibration mount the tube assemblies. This is accomplished by vibration mounting of the tube sheets in conjunction with spring mounting of the ends of the assembly. The tube sheets 140 each have an outwardly extending solid support rod 142 from which they hang in the recuperator. Each rod end 142 is mounted in a vertically extending elongated slot 143 preventing side to side movement while allowing up and down movement. The rod ends each rest on a spring supported stud 144. The stud 144 slides within a bore 145 and a second bore 146 of a flanged end support plate 147. The spring 148 with stop nut 180 provides a flexible action to the support. Damping action is obtained by a friction sliding action as by designing stud 144 with a diameter such that it is in frictional sliding engagement with bore 145 or 146 and by the friction of the tube sheet 140 sliding snugly in the grooves 96 of the recuperator side walls 94. In extreme cases, conventional automobile shock absorbers can be added or other damping means for improved absorption of the energy of vibration can be used.

Ceramic wall 94 preferably includes horizontally extending ribs 194 corresponding to discontinuities in the tube arrangement 90 to prevent the gas from bypassing the tube by flowing along the wall of the recuperator. The wall 94 can be ceramic such as alumina. Materials of higher thermal insulation value with adequate strength are desired.

While specific embodiments of the present invention have been shown and described above, many variations are possible. For example, times and temperatures can vary greatly. In general, the furnace operation is within the range of from 1300° F to 3000° F and the recuperator acts to recoup heat from gas flows having temperatures of from 1300° F to 3000° F and preferably from at least 1500° F to at least 3000° F. The gas such as combustion air heated by the recovered heat energy can be heated to any temperature above ambient but preferably at least 600° F.

While the invention has been described for use in connection with a slot furnace, the burners of this invention can be used in other environments. Generally process furnaces of the type improved by the present invention are those in which temperature control of a work piece is obtained by convection and radiation from hot furnace walls.

What is claimed is:

1. A recirculating burner for use in a furnace area comprising,
    means defining an eductor channel opening to a burner side at one end and having a second end,
    second means defining a second channel having an end interconnected with said second end of said eductor channel, said second channel being positioned to receive heated gas for recirculation,
    said eductor channel having mounted therein a fuel nozzle tip and an eductor combustion air outlet nozzle for passing combustion air toward said fuel nozzle tip with said fuel nozzle tip facing outwardly at said one end,
    third means for supplying combustion air to said combustion air outlet nozzle,
    fuel means for providing fuel at said fuel nozzle tip which fuel is exposed to combustion air from said eductor, and mixed with recirculated gas from said recirculating channel to form a flame front when ignited which flame front is positioned out of said eductor channel one end.

2. A recirculating burner in accordance with claim 1 and further comprising said burner having a fuel capacity of from about ½ to 1000 gallons of fuel oil per hour.

3. A recirculating burner in accordance with claim 2 and further comprising
    said third means for supplying combustion air and said combustion air outlet nozzle being sized and arranged to provide from 25% to 300% by weight of recirculated gases to combustion air in said eductor channel.

4. A recirculating burner in accordance with claim 3 wherein all parts of said burner exposed to hot gases are resistant to degradation at temperatures in the range of from 1000° F to 2400° F.

5. A recirculating burner in accordance with claim 3 and further comprising, said second channel having an opening on said burner side at said one end of said eductor channel.

6. A recirculating burner in accordance with claim 3 wherein said combustion air nozzle is spaced inwardly from said one end for supplying said combustion air in a stream around a fuel tube to said fuel nozzle tip to entrain furnace recirculated gases.

7. In a burner having an outwardly facing eductor channel with a combustion air nozzle mounted therein to provide combustion air about a fuel nozzle tip with provision for entrance of supplemental hot gases to mix with said combustion air and first and second means for respectively providing combustion air to said air nozzle and fuel to said fuel nozzle tip, the improvement comprising, said fuel nozzle tip being constructed and arranged to provide a flame front which is outside of said eductor channel yet along with combustion air flowing around said tip, provides a drawing force to said hot gases through said eductor channel and receives an approximate stoichiometric amount of combustion air and fuel.

8. The improvement of claim 7 wherein said tip is at said outwardly facing end of said eductor channel which opens directly into a furnace area.

9. A recirculating burner in accordance with claim 6 wherein said means for supplying combustion air includes recuperator means for recovering heat from said furnace area and heating said combustion air to a temperature of at least 1000° F.

* * * * *